(12) United States Patent
Wang et al.

(10) Patent No.: US 8,677,832 B2
(45) Date of Patent: Mar. 25, 2014

(54) CORIOLIS MASS FLOW METER

(75) Inventors: Tao Wang, Canterbury (GB); Yousif Hussain, Weston Favell (GB)

(73) Assignee: Krohne AG, Basel (CH)

( * ) Notice: Subject to any disclaimer, the term of this patent is extended or adjusted under 35 U.S.C. 154(b) by 194 days.

(21) Appl. No.: 13/406,759

(22) Filed: Feb. 28, 2012

(65) Prior Publication Data

US 2013/0139612 A1 Jun. 6, 2013

(30) Foreign Application Priority Data

Dec. 2, 2011 (DE) .......................... 10 2011 119 980

(51) Int. Cl.
*G01F 1/84* (2006.01)

(52) U.S. Cl.
USPC ..................................... 73/861.355

(58) Field of Classification Search
USPC ...................... 73/861.355–861.357
See application file for complete search history.

(56) References Cited

U.S. PATENT DOCUMENTS

| | | | |
|---|---|---|---|
| 4,825,705 A | 5/1989 | Hohloch et al. | |
| 5,531,126 A | 7/1996 | Drahm | |
| 6,308,580 B1 | 10/2001 | Crisfield et al. | |
| 7,004,037 B2 | 2/2006 | Andresen et al. | |
| 7,127,952 B2 * | 10/2006 | Bitto et al. | ............... 73/861.355 |
| 7,325,461 B2 | 2/2008 | Bitto et al. | |
| 7,971,494 B2 | 7/2011 | Hussain et al. | |
| 8,104,360 B2 | 1/2012 | Bitto et al. | |
| 2011/0154912 A1 | 6/2011 | Kumar et al. | |
| 2011/0161018 A1 | 6/2011 | Kumar et al. | |
| 2011/0167907 A1 | 7/2011 | Bitto et al. | |
| 2011/0209561 A1 | 9/2011 | Hussain et al. | |
| 2012/0167697 A1 * | 7/2012 | Rieder et al. | ............. 73/861.357 |

FOREIGN PATENT DOCUMENTS

JP 11-230805 A 8/1999

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A Coriolis mass flow meter (1) which has at least two curved measurement tubes (2), at least one actuator arrangement, at least one sensor arrangement and comprising at least one housing structure (5), the measurement tubes (2) being connected at their inlet end portion and an outlet end portion with at least a first oscillation node plate (3) and a second oscillation node plate (4). The flow meter achieves increased measurement accuracy and a reduced susceptibility to perturbing oscillations by at least one of the oscillation node plates being connected at the inlet end and the outlet end of the housing structure (5). A third oscillation node plate (6) can be additionally arranged on the inlet end portion and the outlet end portion of the tubes, the third oscillation node plate being connected to the housing structure.

13 Claims, 6 Drawing Sheets

CORIOLIS MASS FLOW METER

BACKGROUND OF THE INVENTION

1. Field of the Invention

The invention relates to a Coriolis mass flow meter comprising at least two curved measurement tubes, at least one actuator arrangement, at least one sensor arrangement and comprising at least one housing structure, the measurement tubes being combined on the inlet side and the outlet side with at least a first oscillation node plate and a second oscillation node plate.

2. Description of Related Art

Mass flow meters which operate according to the Coriolis principle are known in a multiplicity of configurations in the prior art. Coriolis mass flow meters make it possible to determine the mass throughput of the medium flowing through the measurement tube with high accuracy. In order to determine the mass throughput, the measurement tube is excited into oscillations—in particular, with the eigenfrequency of a particular eigenmode of an oscillation—with an oscillation generator or a plurality of oscillation generators, and the oscillations actually resulting are recorded by oscillation pick-ups and evaluated. The actuator arrangement for the oscillation generation and the sensor arrangements for the oscillation recording are generally constructed so that they comprise a permanent magnet and a magnetic coil for electrically transmitting oscillations to the measurement tube and recording oscillations of the measurement tube, respectively, although the specific configuration is not important here.

In order to evaluate and determine the mass throughput, the phase shift between the oscillations of different sections of the measurement tubes, respectively recorded by two sensor arrangements, is determined, this phase shift being a direct measure of the mass throughput. Coriolis mass flow meters which have a single measurement tube have been known for many years, as well as those which have precisely two or four measurement tubes, the measurement tubes being either essentially straight or curved.

The accuracy with which the mass throughput can be recorded depends, inter alia, on whether perturbing oscillations are superimposed on the oscillations recorded by the sensor arrangements. In order to move undesired oscillation modes as far as possible away from the working frequency of the Coriolis mass flow meter, the oscillation properties of the measurement tube arrangement are modified by design, for example, by modifying the flexural stiffness of individual components, so that no perturbing oscillations occur in the immediate vicinity of the working frequency of the Coriolis mass flow meter.

SUMMARY OF THE INVENTION

Therefore, it is an object of the invention to provide a Coriolis mass flow meter having increased measurement accuracy and a reduced susceptibility to perturbing oscillations.

The aforementioned object is achieved in that at least one of the oscillation node plates is connected on the inlet side and the outlet side to the housing structure of the Coriolis mass flow meter. The measurement tubes extend between the inlet side and the outlet side, the measurement of the mass throughput being carried out between the inlet side and the outlet side by recording the phase difference. Both on the inlet side and on the outlet side, the measurement tubes are combined in their end regions with two oscillation node plates, namely a first oscillation node plate and a second oscillation node plate. At least one of the oscillation node plates, i.e., the first oscillation node plate or the second oscillation node plate, is connected respectively on the inlet side and the outlet side to the housing structure of the Coriolis mass flow meter. The "housing structure" is intended to mean the housing or a part of the housing of the Coriolis mass flow meter, which is not set in oscillation in the operating state and is one of the supporting components of the meter. For the case in which the housing formed predominantly of a thin casing which is fastened on a support frame, the "housing structure" also means, for example, this support frame. Such a support frame is often formed by a stable support bar which is connected to the inlet-side and outlet-side ends of the measurement tubes, and optionally to the flanges provided on these ends.

The connection between the oscillation node plate and the support structure or the housing structure of the Coriolis mass flow meter is established with a material, form or force fit (friction fit). The connection is furthermore provided as a releasable connection, or alternatively as an permanent connection. Screwing, welding or a form-fit connection and a force-fit connection, by bracing the oscillation node plate on the housing structure, have been found to be advantageous forms of connection.

Preferably, that oscillation node plate which lies closest to the corresponding tube end of the measurement tubes, i.e., the tube end on the inlet side or the outlet side, is respectively connected on the inlet side and the outlet side to the housing structure of the Coriolis mass flow meter. The remaining oscillation node plate, which is not connected to the housing structure of the Coriolis mass flow meter, has no contact with the housing structure of the Coriolis mass flow meter and is therefore merely connected to the measurement tubes by being fastened on them.

Those components, for example, manifolds or flanges, which optionally combine the measurement tubes at their ends, but are not primarily provided for modifying the oscillation properties, are to be fundamentally distinguished from the oscillation node plates. A Coriolis mass flow meter according to the invention consequently comprises at least two measurement tubes which are therefore connected not only at their immediate ends, for example via the manifolds, to the housing, but are also connected on both sides respectively by a oscillation node plate to the housing structure of the Coriolis mass flow meter.

The Coriolis mass flow meter according to the present invention has the advantage that unintended oscillation modes are shifted away from the working frequency. This prevents, for example, the two curved measurement tubes from oscillating simultaneously in the axial direction, and it furthermore prevents, for example, the two curved measurement tubes from oscillating simultaneously in common phase orthogonally to the flow direction.

It has been found particularly advantageous for achieving the object of the present invention when, according to a first configuration, a third oscillation node plate is additionally arranged on the inlet side and the outlet side, the third oscillation node plate preferably being connected to the housing structure. In the two end regions of the measurement tubes, i.e., on the inlet side and the outlet side, three oscillation node plates are therefore provided in each case which connect the measurement tubes to one another. On the inlet side and the outlet side, and one of the oscillation node plates is respectively connected to the supporting structure or the housing structure of the Coriolis mass flow meter, this preferably being the third oscillation node plate. The third oscillation node plate is advantageously arranged closest to the respective tube end.

The first oscillation node plate and the second oscillation node plate are consequently connected only to the measurement tubes and are used to form oscillation nodes in the freely oscillating region of the measurement tubes. The third oscillation node plate is also used to form an oscillation node, but is additionally connected to the housing structure of the Coriolis mass flow meter so that undesired oscillation modes of the measurement tubes in the vicinity of the working frequency are prevented.

According to another configuration, the oscillation node plate connected to the housing structure has a base face and the measurement tubes pass through the base face. The base face is preferably formed as a flat planar face, through which the measurement tubes advantageously pass orthogonally. Depending on the configuration, however, other angles may also be provided. The base face of the oscillation node plate is, for example, made from a flat metal sheet or a flat metal plate, so that the base face extends only in a single plane. When it is mentioned that the oscillation node plate with the base face extends only in one plane, this means that the base face extends flat, the material thickness actually provided for the base face not being taken into account. The base face has through-holes for the measurement tubes, in the region of which the measurement tubes are also fastened on the oscillation node plate. Preferably, the oscillation node plate in this embodiment consists only of the base face.

The base face is, for example, configured in a rectangular or square fashion. The base face may, however, also have a round shape, an oval shape or a different shape. Symmetrical shapes—preferably with mirror or point symmetry—have been found to be advantageous for the base face. In the case of a square base face, the through-holes for the measurement tubes are preferably provided off-center so that the base face extends further on one side of the measurement tubes than on the other side of the measurement tubes, so that the oscillation node plate can be connected or is connected to the housing structure with its base face extending further on one side. An off-center arrangement of the measurement tubes is intended to mean that the through-holes for the measurement tubes are arranged next to one another, for example in one of the rectangular halves of the square base face, while the other rectangular half extends next to the measurement tubes.

In the configuration in question, it is furthermore preferable for the oscillation node plate to have a force-fit connection—a friction contact—with the housing structure, so that the oscillation node plate is braced on the housing structure with its base face—a part of the base face.

According to another configuration, it has been found to be advantageous for an extension to be formed on the base face, and for the oscillation node plate to be fastened on the housing structure by means of the extension. The oscillation node plate is, for example, configured asymmetrically owing to the base face with the extension formed on it, so that the flexural stiffness of the oscillation node plate is increased in particular load directions. The oscillation node plate is fastened on the housing by the extension, the extension preferably having a length such that the housing structure is reached by the extension, starting from the measurement tubes. The extension is preferably configured as a web which is formed on the base face.

In order to achieve an advantageous flexural stiffness of the oscillation node plate, according to another configuration the extension extends in the plane of the base face, so that the oscillation node plate is configured in a flat form. The base face of the oscillation node plate in this case preferably extends in one plane, the material thickness of the base face not being taken into account for this consideration. The extension extends in the plane of the base face, so that the oscillation node plate is configured in a flat form overall. The oscillation node plate is fastened on the housing structure of the Coriolis mass flow meter by the extension. It has been found to be advantageous in this case for the oscillation node plate to be connected to the housing structure of the Coriolis mass flow meter by the extension with a form fit, by the extension being engaged on the housing structure with a form fit. Depending on the configuration and the aim of preventing oscillations or shifting eigenfrequencies, the form-fit connection between the extension and the housing structure may permit one, several or no degrees of freedom for the movement of the extension within the engagement on the housing structure.

According to another advantageous configuration of the Coriolis mass flow meter, the base face is essentially rectangular, the extension is formed on a side edge of the base face, and the extension has a smaller width than the side edge of the base face. The base face is essentially configured rectangularly and has a width—the extending in the direction in which the measurement tubes are arranged next to one another—which corresponds to about 2.25 to 5 times a measurement tube diameter. The length of the base face—the extending in the direction of a measurement tube—corresponds to about 1.5 to 2 times a tube diameter. Preferably, the extension is arranged on the wide side edge of the base face and extends in the plane of the base face. In this case, the extension has a width smaller than the width of the side edge of the base face on which it is arranged. Preferably, the width of the extension corresponds to half the width of the base face, the extension being arranged centrally on the side edge. The length of the extension is provided so that the distance between the measurement tubes and the housing structure is bridged by the extension for connection.

In order to achieve advantageous stabilization of the measurement tubes, according to another advantageous configuration, the extension is formed in a plane orthogonal to the base face. The extension therefore does not extend in the plane of the base face, but instead orthogonally to the plane of the base face. This oscillation node plate, which is connected to the housing structure, therefore extends in at least two planes. Preferably, the oscillation node plate is connected to the housing structure via the extension. The two planes of the oscillation node plate, namely the plane of the base face and the plane of the extension, intersect orthogonally. When planes are mentioned here, the material thicknesses of the base face and of the extension are not taken into account for this consideration.

Preferably, the elements of the base face and of the extension are configured as welded parts, for example, by the extension being welded in the form of a web onto the base face. The extension advantageously extends centrally between the two measurement tubes passing through the base face, so that the plane of the extension extends parallel to the measurement tube axes. Depending on the configuration and size of the Coriolis mass flow meter, an extension which is formed from at least two parallel webs is possible.

The web which forms the extension extends, for example, at a particular angle to the base face, so that in the assembled state the obliquely extending measurement tubes pass orthogonally through the base face and at the same time the extension is placed uniformly and with a force fit on one face of the housing structure. The extension is fastened only on one surface of the base face, although, as an alternative, extension may also pass through the base face and be fastened on a further surface. To this end, the base face is at least partially provided with a slot into which the extension is fitted.

In order to achieve an advantageous stiffness of the oscillation node plate, according to another configuration, the material thickness of the oscillation node plate connected to the housing structure is equal to or greater than the wall thickness of the measurement tubes. This ensures a sufficient stiffness of the oscillation node plate, in order to avoid the undesired oscillation modes or move the undesired eigenfrequencies away from the working frequency by design. In this case, the material thickness of the oscillation node plate is intended to mean the material thickness of the base face as well as the extension.

For increasing the flexural stiffness of the oscillation node plate, it has been found particularly advantageous for the extension and the base face to have different material thicknesses, and in particular for the extension to have a greater material thickness than the base face. The base face connects the two measurement tubes to one another, while the extension is used for connecting the base face to the housing structure of the Coriolis mass flow meter. To this end, the extension is preferably configured to be thicker than the base face, so that the extension has a greater flexural stiffness. To this end, for example, the oscillation node plate consisting of the base plate and the extension is configured as a welded part consisting of at least two components.

A further factor which advantageously influences the flexural stiffness of the oscillation node plate is that, according to another configuration, the length of the side edges of the base face and the length of the side edges of the extension are greater than the material thickness of the base face and of the extension. The base face and the extension are preferably made from thin sheet metal or a metal plate, so that the length and width of the base face and the length and width of the extension are always substantially greater than the thickness of the base face and of the extension, so that advantageous flexural properties are achieved. At the same time, the weight of the oscillation node plates is reduced by this simple design.

The overall weight of the Coriolis mass flow meter is further reduced according to another configuration in that the material thickness of the oscillation node plate connected to the housing structure is less than that of the at least one other oscillation node plate. The oscillation node plate connected to the housing structure is therefore thinner than the other oscillation node plates. While the other oscillation node plates are primarily used to form oscillation nodes between the measurement tubes, the oscillation node plate connected to the housing structure is primarily used to shift undesired eigenfrequencies away from the working frequency of the Coriolis mass flow meter, for which reason the material thickness of the oscillation node plate connected to the housing structure can be reduced.

Furthermore, according to one configuration, it has been found advantageous for the distance between the first oscillation node plate and the second oscillation node plate to be less than the distance between the second oscillation node plate and the third oscillation node plate. In this case, the distance is intended to mean the distance measured with the aid of the length travelled on the measurement tubes. The third oscillation node plate is, in this case, respectively, the oscillation node plate arranged closest to the tube end, while the first oscillation node plate is the oscillation node plate which is furthest away from the corresponding tube end. The oscillation node plates primarily used to form oscillation nodes, i.e., the first and second oscillation node plates, have a shorter distance between them while the third oscillation node plate, which is used for connection to the housing structure, lies at a greater distance from the other two. By this configuration, an advantageous shift of the undesired eigenfrequencies can take place and the coupling of oscillations out of the measurement tubes onto the surrounding pipeline system can be prevented.

According to a last configuration of the Coriolis mass flow meter, four curved measurement tubes are provided. The four curved measurement tubes allow a greater mass throughput in comparison with merely two curved measurement tubes, all the advantages described above also being achieved identically for the Coriolis mass flow meter comprising four curved measurement tubes.

In detail, there are now a multiplicity of possibilities for configuring and refining the Coriolis mass flow meter according to the invention. In this regard, reference is made to the following detailed description of preferred exemplary embodiments in conjunction with the accompanying drawings.

DETAILED DESCRIPTION OF THE INVENTION

Figure 1:
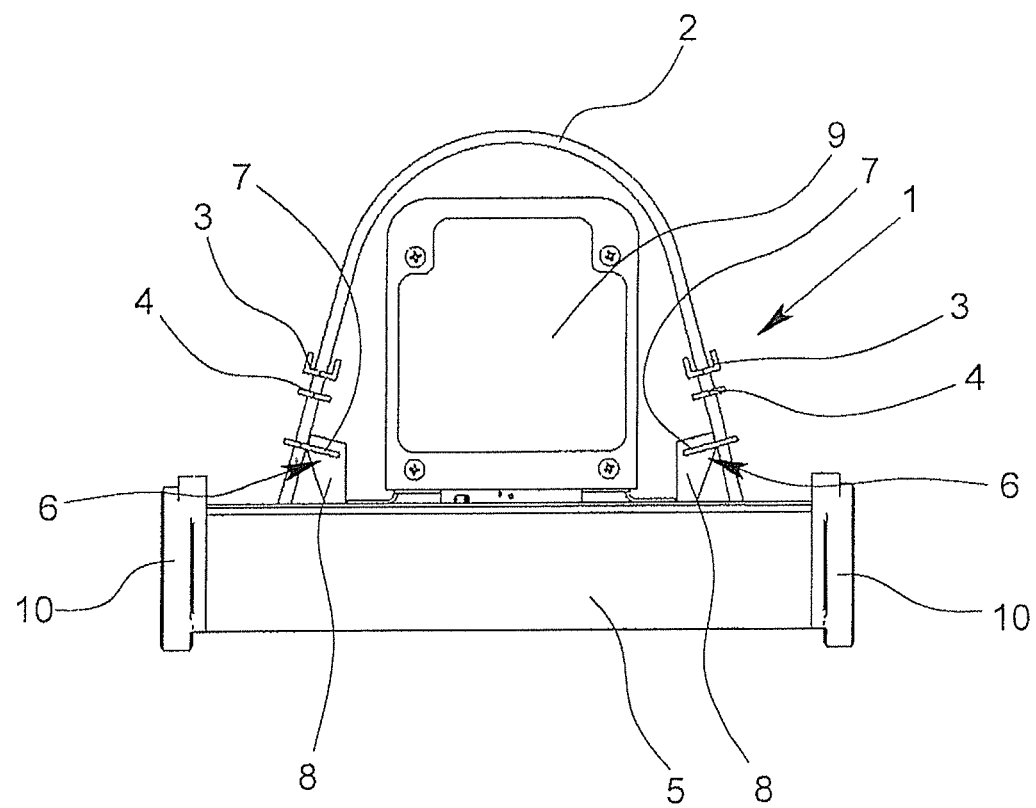
FIG. 1 is side view of an exemplary embodiment of a Coriolis mass flow meter.

FIG. 1 shows a Coriolis mass flow meter 1 comprising two curved measurement tubes 2. On the inlet side and the outlet side, the measurement tubes 2 are combined with a first oscillation node plate 3 and a second oscillation node plate 4. For fastening to the housing structure 5 on the inlet side and the outlet side, a third oscillation node plate 6 is arranged on both sides and likewise combines the measurement tubes 2. The third oscillation node plate 6, which is connected to the housing structure 5, has a base face 7 through which the measurement tubes 2 passes orthogonally.

The measurement tubes 2 are connected firmly to the base face 7. The base face 7 is configured as a flat plate. An extension 8 is formed on the base face 7. In this exemplary embodiment, the plane of the extension 8 extends orthogonally to the plane of the base face 7. The third oscillation node plate 6 is connected—on the inlet side and the outlet side—to the housing structure 5 of the Coriolis mass flow meter 1 by the extension 8. The web, which is foamed by the extension 8, is arranged at an angle to the plane of the base face 7 and is braced on a face of the housing structure 5 with a force fit.

The extension 8 is configured so that it passes through the plane of the base face 7 and is fastened on the base face 7. The third oscillation node plate 6 therefore extends in two planes, so that an advantageous flexural stiffness is achieved. The extension 8 is configured to be wider in the upper region—see, FIG. 1, i.e., in the region of the base face 7, than in the lower region—see, FIG. 1, where the extension 8 is braced on the housing structure 5. The plane of the extension 8 extends centrally in the base face 7 between the two measurement tubes 2, parallel to the mid-axes of the two measurement tubes. An advantageous flexural stiffness of the third oscillation node plate 6 is achieved by this configuration.

Besides the measuring equipment electronics 9, e.g., sensor and actuator arrangements, necessary for operation of the Coriolis mass flow meter 1, the flanges 10 are provided on the ends of the extension 8 of the third oscillation node plate 6 have no contact with the 5 and used for connection of the Coriolis mass flow meter 1 to the medium flow pipes. The ends of the measurement tubes 2 are connected to the the flanges 1, but except for the connection via the extension 8 of the third oscillation node plate 6 have no contact with the housing structure 5 of the Coriolis mass flow meter 1.

Figure 2:
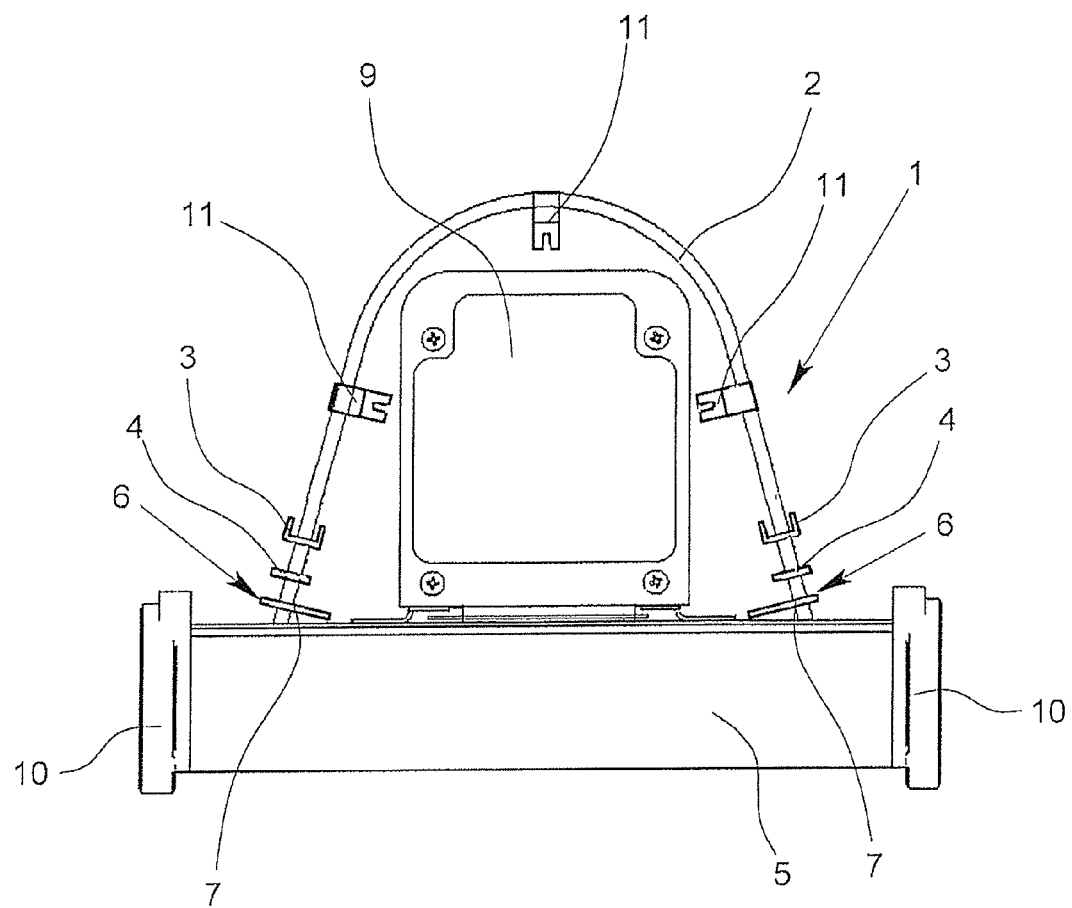
FIG. 2 is side view of an exemplary embodiment of a Coriolis mass flow meter.

FIG. 2 shows a further exemplary embodiment of a Coriolis mass flow meter 1 comprising two curved measurement tubes 2. The holding devices 11 for the actuator and sensor arrangements—not represented—are fastened on the measurement tubes 2. In this exemplary embodiment as well, the measurement tubes 2 are combined on the inlet side and the outlet side with a first oscillation node plate 3 and a second oscillation node plate 4. A third oscillation node plate 6 is furthermore provided, which is connected to the housing structure 5 of the Coriolis mass flow meter 1 and with which the measurement tubes 2 are likewise combined.

In the exemplary embodiment according to FIG. 2, the third oscillation node plate 6 consists only of a base face 7, which extends in a single plane and through which the measurement tubes 2 pass orthogonally. The third oscillation node plate 6 has a square base face 7, the through-holes 12 for the measurement tubes 2 being located off-center and the third oscillation node plate 6 extending further on one side of the measurement tubes 2 than on the other side—the through-holes for the measurement tubes 2 are arranged in one rectangular half of the square base face 7. On the side where the third oscillation node plate 6, or the base face 7, extends further, it is braced on the housing structure 5, or connected thereto.

Figure 3:
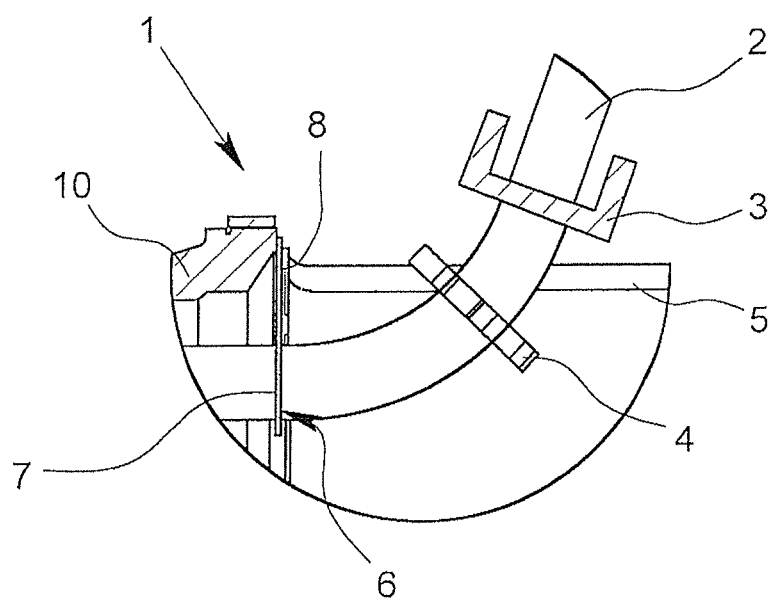
FIG. 3 is a cutaway detail of an exemplary embodiment of a Coriolis mass flow meter.

FIG. 3 shows a detail of another exemplary embodiment of a Coriolis mass flow meter 1 comprising two curved measurement tubes 2. The inlet-side end of the measurement tubes 2, where the measurement tubes 2 are combined with a first oscillation node plate 3, a second oscillation node plate 4 and a third oscillation node plate 6, is represented. The third oscillation node plate 6 comprises an extension 8, which extends in the plane of the base face 7. The extension 8 is connected to the housing structure 5 of the Coriolis mass flow meter 1. The measurement tubes 2 have contact with the housing structure 5 of the Coriolis mass flow meter 1 only via the third oscillation node plate 6 and via the connection to the flanges 10.

Figure 4:
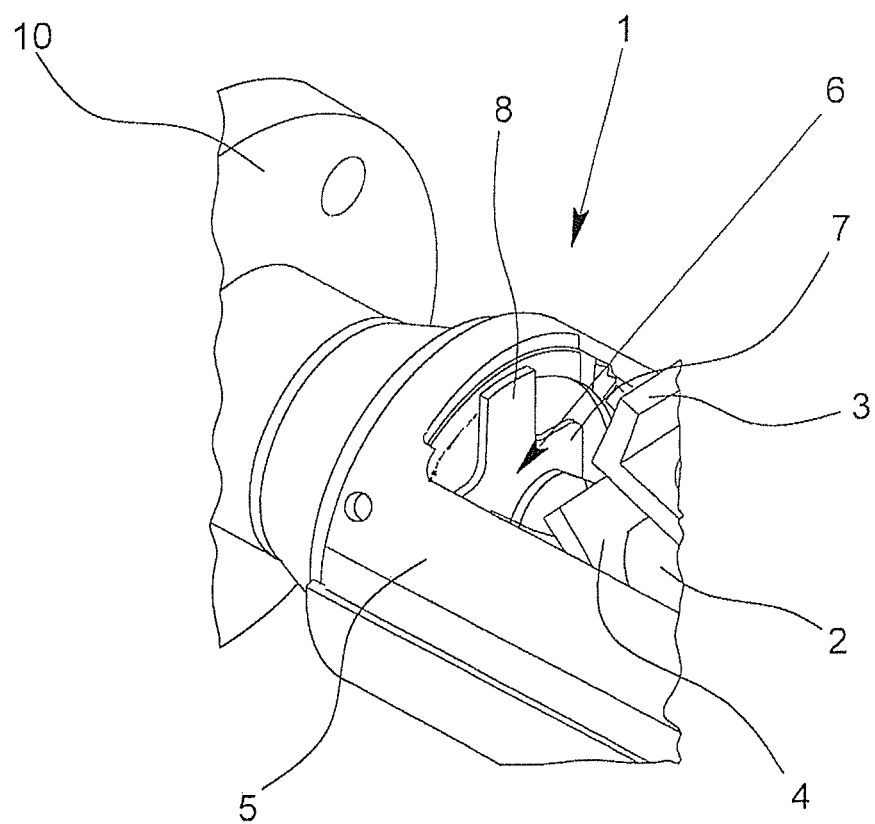
FIG. 4 shows a cutaway perspective side view of a Coriolis mass flow meter.

FIG. 4 shows a detail of another exemplary embodiment of a Coriolis mass flow meter 1 in perspective side view. The housing structure 5 of the Coriolis mass flow meter 1 is partially open. The third oscillation node plate 6 comprises a base face 7, on which an extension 8 is arranged. In this exemplary embodiment, as well, the extension 8 extends in the plane of the base face 7. The third oscillation node plate 6 is connected to the housing structure 5 of the Coriolis mass flow meter 1 via the extension 8.

The third oscillation node plate 6 is braced with a force fit on the housing structure 5 of the Coriolis mass flow meter 1 by the extension 8, so that forces in the axial direction of the measurement tubes 2 are transmitted onto the housing structure 5 of the Coriolis mass flow meter 1, although oscillation of the two measurement tubes about a common axis through the third oscillation node plate 6 is not prevented, in this exemplary embodiment, since the extension 8 of the third oscillation node plate 6 is mobile in this direction along the housing structure 5 of the Coriolis mass flow meter 1. Owing to such an arrangement of the third oscillation node plate 6, in particular, oscillations in the axial direction of the measurement tubes 2 are prevented.

Figure 5:
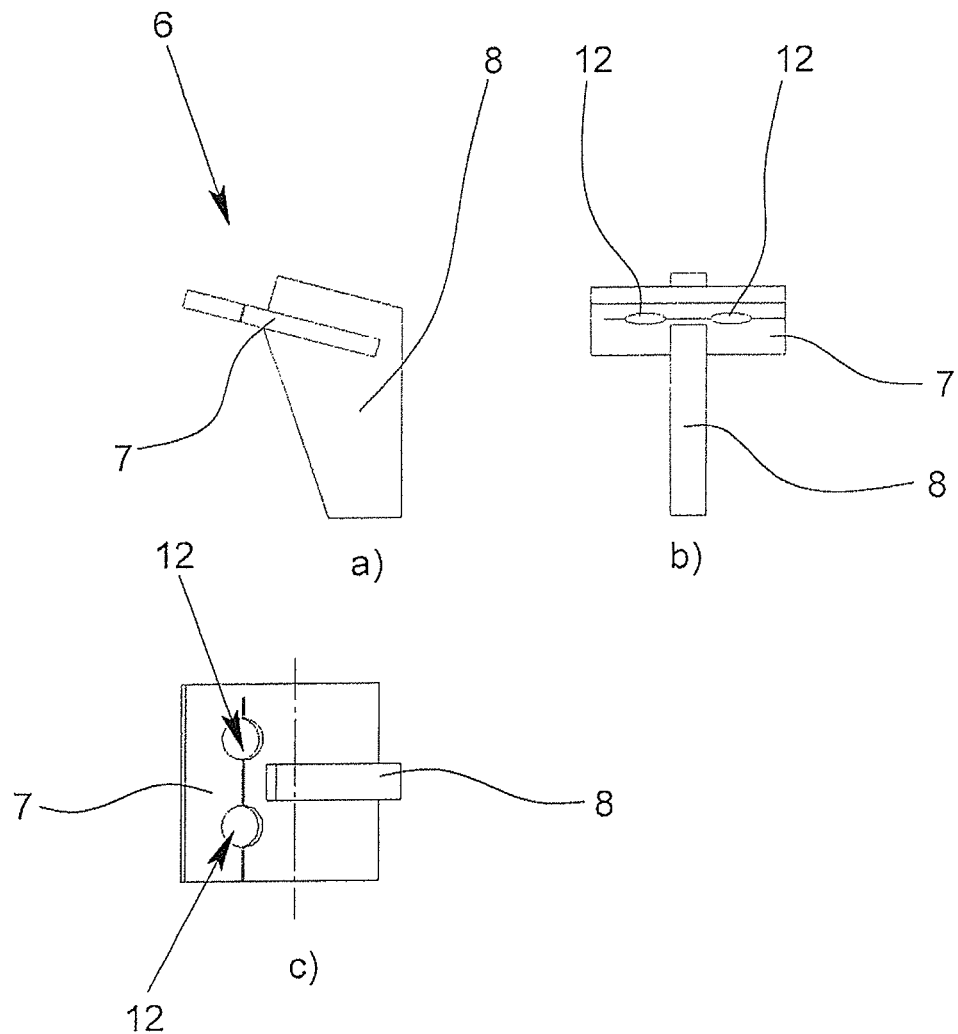
FIG. 5a is side view of an exemplary embodiment of an oscillation node plate for fastening on a housing structure.
FIG. 5b is another side view of the exemplary embodiment turned 90° relative to FIG. 5a, FIG. 5c a plan view of the exemplary embodiment according to FIGS. 5a & 5b.

FIGS. 5a), 5b) and 5c) show an exemplary embodiment of an oscillation node plate 6 for connection to a housing structure 5 of a Coriolis mass flow meter 1 according to FIG. 1 in various views. The plane of the base face 7 of the oscillation node plate 6 extends orthogonally to the plane of the extension 8 of the oscillation node plate 6. The oscillation node plate 6 therefore extends in two planes, the material thicknesses of the base face 7 and of the extension 8 not being taken into account for this consideration of the "planes".

The material thickness of the extension 8 in this exemplary embodiment is about twice as great as the material thickness of the base face 7. In order to improve the flexural stiffness of the oscillation node plate 6, the length and the width of the base face 7 and of the extension 8 are each substantially greater than the corresponding material thickness. The base face 7 has two through-holes 12 for the measurement tubes 2, so that the measurement tubes 2 pass orthogonally through the base face 7 in the assembled state. The web formed by the extension 8 is configured so that it is wider in the upper region, where the extension 8 is connected to the base face 7, than in the lower region where the extension 8 is connected to the housing structure 5 of the Coriolis mass flow meter 1. The material thickness of the base face 7 in this exemplary embodiment corresponds to the wall thickness of the measurement tubes 2.

According to FIGS. 5a to 5c, the width of the base face—extending from left to right in FIG. 5c—corresponds to about 5 times the measurement tube diameter. Since the base face 7 is configured in a square form, the length of the base face 7—extending from top to bottom in FIG. 5c—also corresponds to about 5 times a measurement tube diameter.

According to FIG. 5a, the length of the extension 8—extending from bottom to top—corresponds to about 1.5 times the width or the length of the base face 7. The width of the extension 8—extending from left to right in FIG. 5a—in the lower region corresponds to about half the width in the upper region, the width in the upper region corresponding to about four times the measurement tube diameter.

The extension extends both above and below the base face 7, so that the base face 7 can advantageously be connected to the extension 8. The length of the extension 8—extending between the housing structure 5 and the base plate 7 according to FIG. 5a—is dimensioned so that the housing structure 5 can be reached starting from the measurement tubes 2, or the base plate 7. In the exemplary embodiment, according to FIGS. 5a to 5c, the base face of the oscillation node plate 6 is configured in a square the through-holes 12 for the measurement tubes 2 being arranged off-center so that the base face 7 extends further on one side of the measurement tubes 2 than on the other side. On the side where the base face 7 extends further from the measurement tubes 2 (on the right in FIG. 5c), the extension 8 is fastened centrally on the base face 7 between the two through-holes 12 for the measurement tubes.

Figure 6:
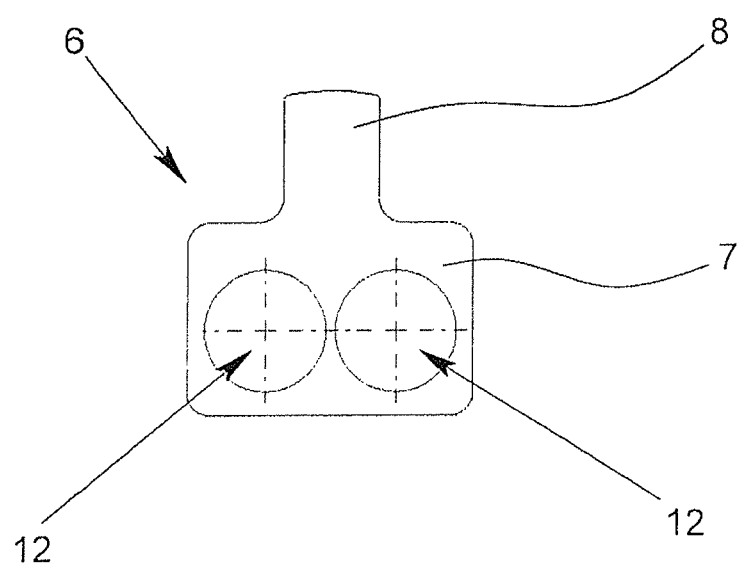
FIG. 6 is side view of an exemplary embodiment of an oscillation node plate for fastening on a housing structure.

FIG. 6 shows a side view of an exemplary embodiment of an oscillation node plate 6 according to the exemplary embodiments in FIGS. 3 & 4. The base face 7 of the oscillation node plate 6 is essentially configured in a rectangular form, the through-holes 12 for the measurement tubes 2 being arranged centrally in the essentially rectangular base face 7.

The width of the base face 7—extending in the direction of the two measurement tubes arranged next to one another—corresponds in this exemplary embodiment to about 2.25 times the diameter of a measurement tube 2. The length of the base face 7—extending, respectively, in the direction of a measurement tube 2—corresponds in this exemplary embodiment to about 1.5 times the measurement tube diameter.

The extension 8, which extends in the plane of the base face 7, is arranged on the upper side, represented in FIG. 6, of the base face 7. The width of the extension 8 is less than the width of the base face 7, the width of the extension 8 in this exemplary embodiment being about half the width of the base face 7. The length of the extension 8 is adapted to the distance from the measurement tubes 2 to the housing structure 5 of the Coriolis mass flow meter 1, and in this exemplary embodiment, corresponds approximately to the measurement tube diameter. The material thickness of the oscillation node plate 6 corresponds to the wall thickness of the measurement tubes 2.

The oscillation node plate 6 represented in FIG. 6 is preferably suitable for preventing oscillations in the axial direction of the measurement tubes 2, which in the assembled state pass orthogonally through the through-holes 12. According to the exemplary embodiment in FIG. 4, one degree of freedom is provided for the extension 8 in the rotation direction about the common rotation axis of the measurement tubes 2 in the assembled state.

What is claimed is:

1. Coriolis mass flow meter, comprising:
   at least two curved measurement tubes,
   at least one actuator arrangement,
   at least one sensor arrangement and
   a housing structure,
   wherein the measurement tubes are connected on an inlet end portion and on an outlet end portion by at least a first oscillation node plate and a second oscillation node plate, and
   wherein at least one of the oscillation node plates is connected on the inlet end portion and the outlet end portion to the housing structure.

2. Coriolis mass flow meter according to claim 1, wherein a third oscillation node plate is additionally arranged on the inlet end portion and the outlet end portion, the third oscillation node plate being connected to the housing structure.

3. Coriolis mass flow meter according to claim 2, wherein the third oscillation node plate has a base face through which the measurement tubes pass.

4. Coriolis mass flow meter according to claim 3, wherein an extension is formed on the base face, and wherein the third oscillation node plate is fastened on the housing structure by means of the extension.

5. Coriolis mass flow meter according to claim 4, wherein the base face is a flat plate and wherein the extension extends in a plane of the base face, so that the third oscillation node plate has a flat foam.

6. Coriolis mass flow meter according to claim 5, wherein the base face is essentially rectangular, wherein the extension is foamed on a side of the base face, and wherein the extension has a smaller width than the side of the base face.

7. Coriolis mass flow meter according to claim 4, wherein the base face is a flat plate and wherein the extension is formed in a plane that is orthogonal to the base face.

8. Coriolis mass flow meter according to claims 1, wherein the third oscillation node plate has a thickness that is equal to or greater than a wall thickness of the measurement tubes.

9. Coriolis mass flow meter according to one of claims 4, wherein the extension and the base face have different thicknesses, and the extension has a greater thickness than the base face.

10. Coriolis mass flow meter according to claims 9, wherein side edges of the base face have a length that is greater than the thickness of the base face and of the extension.

11. Coriolis mass flow according to claim 10, wherein the thickness of the third oscillation node plate is less than that of at least one first and second oscillation node plates.

12. Coriolis mass flow according to claim 2, wherein the distance between the first oscillation node plate and the second oscillation node plate are closer to each other than the second oscillation node plate is from the third oscillation node plate, and wherein the first oscillation node plate is further from the third oscillation node plate than the second from the oscillation node plate.

13. Coriolis mass flow according to claim 1, wherein said at least two curved measurement tubes comprises four curved measurement tubes.

* * * * *